UNITED STATES PATENT OFFICE.

766,938

ORVIS GOLDEN DIEFENDORF, OF WATERTOWN, NEW YORK.

PROCESS OF MAKING BRICK.

SPECIFICATION forming part of Letters Patent No. 766,938, dated August 9, 1904.

Application filed September 25, 1903. Serial No. 174,642. (No model.)

*To all whom it may concern:*

Be it known that I, ORVIS GOLDEN DIEFENDORF, brick manufacturer, of Watertown, in the county of Jefferson, State of New York, have invented a certain new and useful Process of Making Bricks, of which the following is a specification.

In the manufacture of bricks from various mixtures in which cement and sand are used it has been customary in the past first to thoroughly wet the cement and sand or other earth while they are being mixed and then to press them, forcing the moisture out, afterward allowing them to dry. I have found, however, that this process tends to produce and, in fact, has always produced a very rough unfinished brick, owing to the fact that the water running out of the brick disturbs the surface of sand and cement, carrying with it grains of sand, thus completely spoiling the smoothness of the surface.

In the course of experiment I have arrived at a new process which is cheap and simple, in the use of which I have found that an extremely smooth, clean, good, and well-finished brick is produced, and this process I will now describe.

The essential ingredients which are mixed together are, first, any gritty or friable earth— such as ground stone, sand, gravel, or the like— and with this earth a suitable cement (preferably Portland cement) is mixed, the proportions being about one part of cement to four or five of earth; but if sharp clean sand is used less cement is required. It is preferable in this process to use earth which is very slightly damp, and with this earth the cement is very thoroughly mixed. If, however, only perfectly dry earth is obtainable, it may be first thoroughly mixed with the cement perfectly dry, and the mixture is then very slightly dampened, the amount of liquid added not being sufficient to make the mixture into a paste. The manner of testing the mixture in practice to find if it is sufficiently damp is to simply compress a small amount in the hand, and if it contains the proper amount of moisture it will just remain in shape when released, but if touched will fall apart. Having got the cement and friable earth properly mixed and dampened, the next step is to form the bricks and press them at an extremely high pressure, the pressure used in practice being approximately two thousand pounds to the square inch, or, in other words, thirty-two tons on the surface of the brick. The brick is then taken out of the press and allowed to stand until it is found that a thin crust has formed on the outside surface of the brick. The time which this crust requires to form varies according to the conditions of the atmosphere, and on a very bright dry windy day it will only take about two hours. When this crust has formed on the brick, water is sprinkled thereon until the brick has absorbed as much as possible, or, in other words, until the brick is saturated. In order to test the hardness of the crust which forms on the surface of the brick, the usual plan is to scrape it with the finger-nail and if the finger-nail cuts into the brick it is not sufficiently hard; but if the surface of the brick is sufficiently hard to file or wear down the finger-nail the bricks are ready to be sprinkled with water. The bricks after having been sprinkled with water are allowed to stand, preferably from twenty to forty-eight hours on palettes or boards, and during this time the cement in the interior of the brick hardens and firmly secures together the particles of ground stone, sand, gravel, or other friable earth, and it is found that when the brick dries it neither shrinks nor expands and retains an extremely smooth surface with clean sharp edges.

The color of the brick prepared as above is generally a light gray; but if a brick of any other color—such as red, blue, green, or black— is required, suitable coloring-matter may be mixed with the cement and sand during the first step of the process, and it will thus be seen that by means of my process a cheap and very strong durable brick will be produced.

What I claim as my invention is—

1. The process of making bricks which consists in mixing the ingredients including cement and a small quantity of water; then forming the bricks in suitable molds; then subjecting the material in the molds to a pressure of two thousand pounds on the square inch or thereabout, thereby causing the small quantity of moisture contained to come to the surface of the molds; then removing the bricks from the molds and allowing them to stand exposed to the air till a thin hard crust is formed on their surface; then wetting the bricks, then allowing the bricks to stand and harden, substantially as described.

2. The process of making bricks which consists in first mixing the ingredients including cement and moist friable earth; then forming the bricks in suitable molds; then subjecting the material in the molds to a pressure of two thousand pounds on the square inch or thereabout, thereby causing the small quantity of moisture contained to come to the surface of the molds; then removing the bricks from the molds and allowing them to stand exposed to the air till a thin hard crust is formed on their surface; then wetting the bricks; then allowing the bricks to stand and harden, substantially as described.

3. The process of making bricks which consists in first mixing the ingredients including cement and friable earth; then adding a small amount of moisture to the mixture; then forming the bricks in suitable molds; then subjecting the material in the molds to a pressure of two thousand pounds on the square inch or thereabout, thereby causing the small quantity of moisture contained to come to the surface of the molds; then removing the bricks from the molds and allowing them to stand exposed to the air till a thin hard crust is formed on their surface; then wetting the bricks; then allowing the bricks to stand and harden, substantially as described.

4. The process of making bricks which consists in first mixing the ingredients including cement, friable earth, coloring-matter and a small quantity of water; then forming the bricks in suitable molds; then subjecting the material in the molds to a pressure of two thousand pounds on the square inch or thereabout, thereby causing the small quantity of moisture contained to come to the surface of the molds; then removing the bricks from the molds and allowing them to stand exposed to the air till a thin hard crust is formed on their surface; then wetting the bricks; then allowing the bricks to stand and harden, substantially as described.

Signed at Watertown, in the county of Jefferson, State of New York, this 10th day of September, 1903.

ORVIS GOLDEN DIEFENDORF.

Witnesses:
S. HARLAND WETMORE,
FAYETTE F. CORY.